(12) United States Patent
Escolà et al.

(10) Patent No.: US 8,274,547 B2
(45) Date of Patent: Sep. 25, 2012

(54) SYSTEM AND PROCEDURE FOR CALL CENTRE COMMUNICATIONS

(75) Inventors: José Luis Cantero Escolà, Molins de Rei (ES); Alex Bisbe Tosat, Sant Cugat del Valles (ES)

(73) Assignee: Outservico Technologies, S.L., Madrid (ES)

( * ) Notice: Subject to any disclaimer, the term of this patent is extended or adjusted under 35 U.S.C. 154(b) by 676 days.

(21) Appl. No.: 12/433,046

(22) Filed: Apr. 30, 2009

(65) Prior Publication Data

US 2010/0277564 A1 Nov. 4, 2010

(51) Int. Cl.
*H04N 7/14* (2006.01)
(52) U.S. Cl. ............... 348/14.08; 348/14.11; 348/14.01
(58) Field of Classification Search .... 348/14.01–14.16; 379/265.01–265.02, 265.09; 709/204, 218; 725/60, 42, 135
See application file for complete search history.

(56) References Cited

U.S. PATENT DOCUMENTS

| 6,046,762 A * | 4/2000 | Sonesh et al. .............. 348/14.11 |
| 2003/0033382 A1 * | 2/2003 | Bogolea et al. ............... 709/218 |
| 2004/0181801 A1 * | 9/2004 | Hagen et al. .................... 725/32 |

* cited by examiner

*Primary Examiner* — Melur Ramakrishnaiah
(74) *Attorney, Agent, or Firm* — Gottlieb, Rackman & Reisman, P.C.

(57) ABSTRACT

System that includes a web server (2) enabling the user to access, from a remote computer (5), several nodes (1) that include a primary node server (11), which is connected to: —a management database (12); —at least one PABX (13), —at least one video server (14); —and a number of representative rooms (15), where there is a telephone terminal (16) connected to one of the PABXs (13) and a webcam (17) or video camera connected to one of the video servers (14), enabling two-way voice transmission between the representative and the user, by means of telephone communication through the telephone terminal (16) and the telephone (4), and one-way transmission of video images from the webcam (17) to the user's remote computer (5).

6 Claims, 2 Drawing Sheets

SYSTEM AND PROCEDURE FOR CALL CENTRE COMMUNICATIONS

PURPOSE OF THE INVENTION

The invention described herein refers to a system and procedure for call centre communications, or more specifically, a system that is capable of multimedia communication between a remote telesales agent, customer service or information representative, etc. and a user accessing one or more offered services or general information.

BACKGROUND OF THE INVENTION

Currently call centres are most commonly used for providing consumer support for certain companies and offering information in general. For example, a telesales centre or a centre offering remote sale of goods and services to the user/consumer focuses on two main methods.

Firstly there is cold calling, where the seller contacts the user to offer them their products or services. In this case the user may become aggressive, since the call was not made by them directly, and therefore unless they happen to want the product at that precise moment, the communication is largely unproductive. Furthermore, the information flow that may pass between the seller or representative and the user is limited solely to the telephone audio channel. In other instances the user may call the seller after having seen an advertisement for a product or service that they may be interested in, but this trade channel requires a costly advertising campaign beforehand in order to reach the potential user/consumer.

Another channel for making remote contact or pursuing telesales or providing support and information is through computers connected to the Internet and publishing promotional websites, hosted by an appropriate server. By using this data communication channel, users (primarily interested users) can search for the product they are interested in and contact the seller or representative who is offering the products or services. However, the use of websites limits direct contact between the seller, information provider or host and the user, which is often vital for providing more information and stimulating the user's interest.

In an attempt to resolve this problem, some websites have video conferencing services to enable the user to speak to a representative directly. Nevertheless, this method of communication presents certain problems.

Thus, in some cases video conferencing or telepresence systems are used. These systems require both the user and the provider to have specific equipment in order to be able to use VoIP (Voice over Internet Protocol) technology, which means that users must have a computer with a microphone and headphones that have been properly installed and set up for use. In certain cases video conferencing also requires the user to use webcams, which makes the connection even more complicated, since not all users have this equipment or have it installed compatibly.

In certain cases the equipment used is a specific integrated video conferencing device. These are not used on a mass scale and therefore would be useful only for a small number of users.

These video conferencing systems have high bandwidth consumption and therefore perform poorly over connections with insufficient bandwidth, with outages and delays occurring in the voice reproduction. As a result they are not suitable for a flowing conversation. In addition, most common domestic internet connections, for example ADSL, have an upload speed that is slower than the download speed; therefore the communication in the user-representative direction is very limited.

A further difficulty is that these systems require the user to download or install additional software or specific plug-ins for the browser they are using in order to provide the appropriate program and protocol resources with which to establish the communication. This can be awkward and difficult depending on the user's computer.

DESCRIPTION OF THE INVENTION

The system and procedure for call centre communications, which is the purpose of this invention, offers several technical features that are designed to enable a user searching for a product or service on a computer connected to a global network or the Internet to contact a commercial representative immediately, as if they were having a face-to-face conversation in an office, and without having to leave their home or their current location. This ensures optimal communication quality for holding a conversation and for the data flow between the user and the representative with low bandwidth requirements.

In accordance with the invention, the system includes a web server associated with several nodes that include a primary node server, which is connected to: —a management database; —at least one PABX (private automatic branch exchange), —at least one video server; —and several representative rooms, where there is a telephone terminal connected to one of the PABXs and a webcam or video camera connected to one of the video servers, enabling two-way voice transmission between the representative and the user by means of telephone communication through the telephone terminal in the representative room and the user's landline or mobile telephone, and one-way transmission from the webcam or video camera in the representative room to the user's remote computer.

In this way, when the user surfs the Internet until they reach the website that is offering the product or service, the user fills in an initial form, which includes at least a telephone number, as well as other optional details, such as name, surname, etc. Immediately afterwards the system allows a representative to call the user's landline or mobile telephone, establishing the initial two-way audio communication channel and, in turn, the browser opens a window or a full screen with the video transmission from the representative to the user's remote computer, allowing them to enter into an initial conversation under optimal conditions. This system offers several significant advantages: the data flow requirement for the user's Internet connection is reduced, since it only transmits the video data from the representative to the user, and the telephone sound quality is better than with VoIP or Voice over Internet Protocol, meaning that this communication is completely independent and free from transmission outages due to exhaustion of the available data bandwidth.

The video server transmits the images on the webcam or video camera in a compatible format that can be displayed by the user's remote computer browser, Adobe Flash® for example, which is commonly installed on computers with an Internet connection. Therefore, the requirements for resources and accessories on the user's remote computer are far lower and almost always available without the need for any additional installation.

In practice, there is a computer in the representative room that is connected to the node server for managing and accessing the database. In this way, the representative can show presentations, photographs and videos on the offered goods or services to the user through this same window, and see how the details that the user has provided over the telephone are being entered.

One of the advantages offered by the system is the scalability and the growth potential when dealing with a number of users connected simultaneously. Thus, the number of representative rooms can be easily increased by increasing the number of video servers and PABXs that are connected to a node. Furthermore, several nodes can operate simultaneously, even in different parts of the world; thus, a 24 hours a day service can be provided. In order to manage these nodes, a monitoring server connected to one or more remote node servers is planned.

Thus, the communications procedure includes the following phases:

Acquiring the user's telephone number from the form previously filled in on the website.

Sending the telephone number and details to the node server.

Activating a PABX so that a call is made to the user's telephone number in the hope that the user answers the call.

once the connection between the PABX and the user's telephone has been established, after the user's phone has gone off hook, the call is transferred to a free representative room, using the aforementioned connection between the PABX and the telephone terminal in the room, and the connection between the video server that corresponds to the webcam in the representative room and the user's remote computer for transmitting the images of the representative, who is located in the aforementioned representative room, through said webcam to the remote user's computer screen.

The procedure also includes the transmission of visual data and images from the node server database to the user's remote computer.

DESCRIPTION OF THE FIGURES

In order to supplement the description and make the characteristics of the invention easier to understand, this descriptive report comes with a set of diagrams, which include but are not limited to the following.

PREFERRED IMPLEMENTATION OF THE INVENTION

Figure 1:
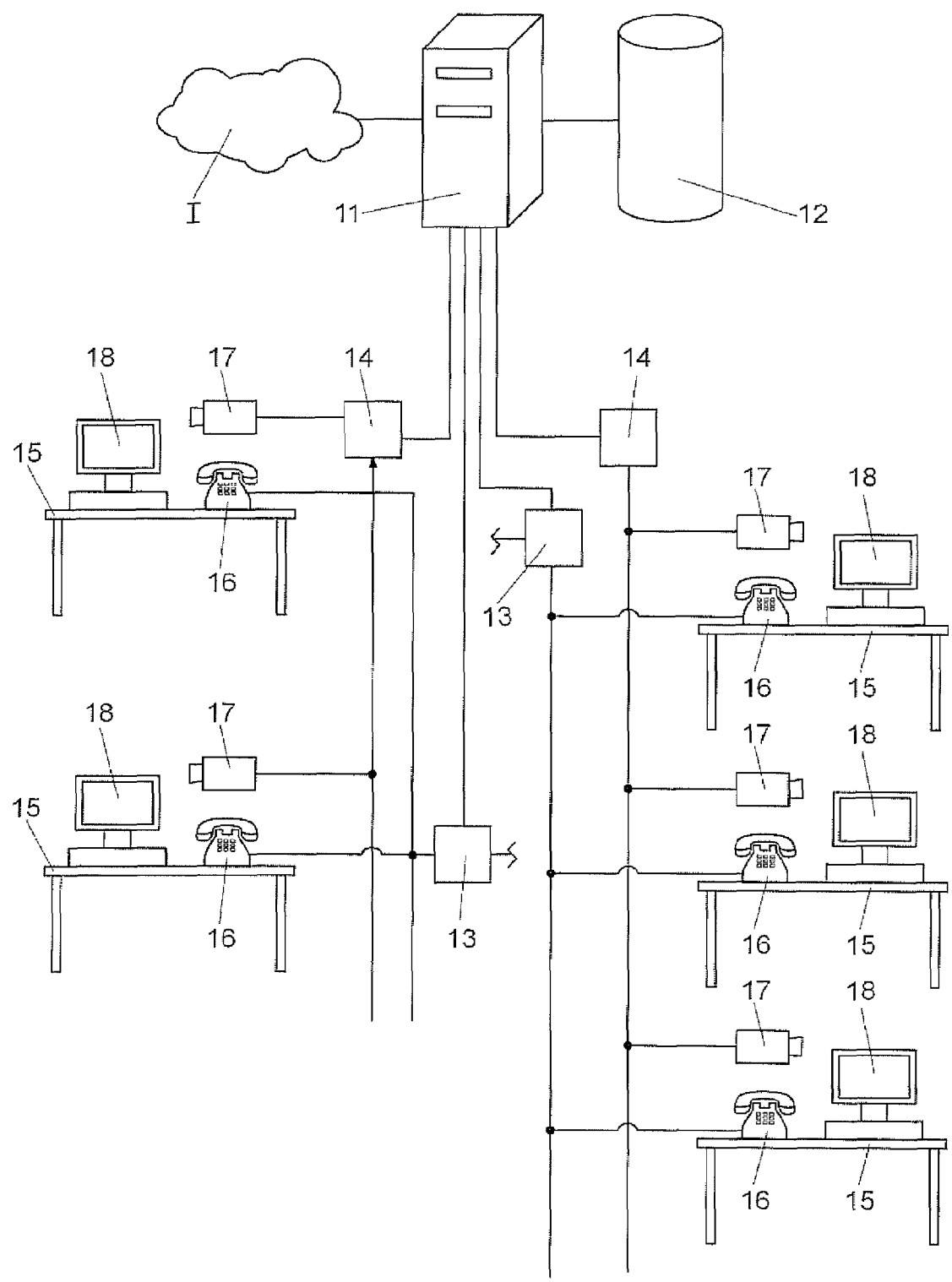
FIG. 1 shows an implementation diagram of a system node connected to the Internet and a conventional telephone network.
Figure 2:
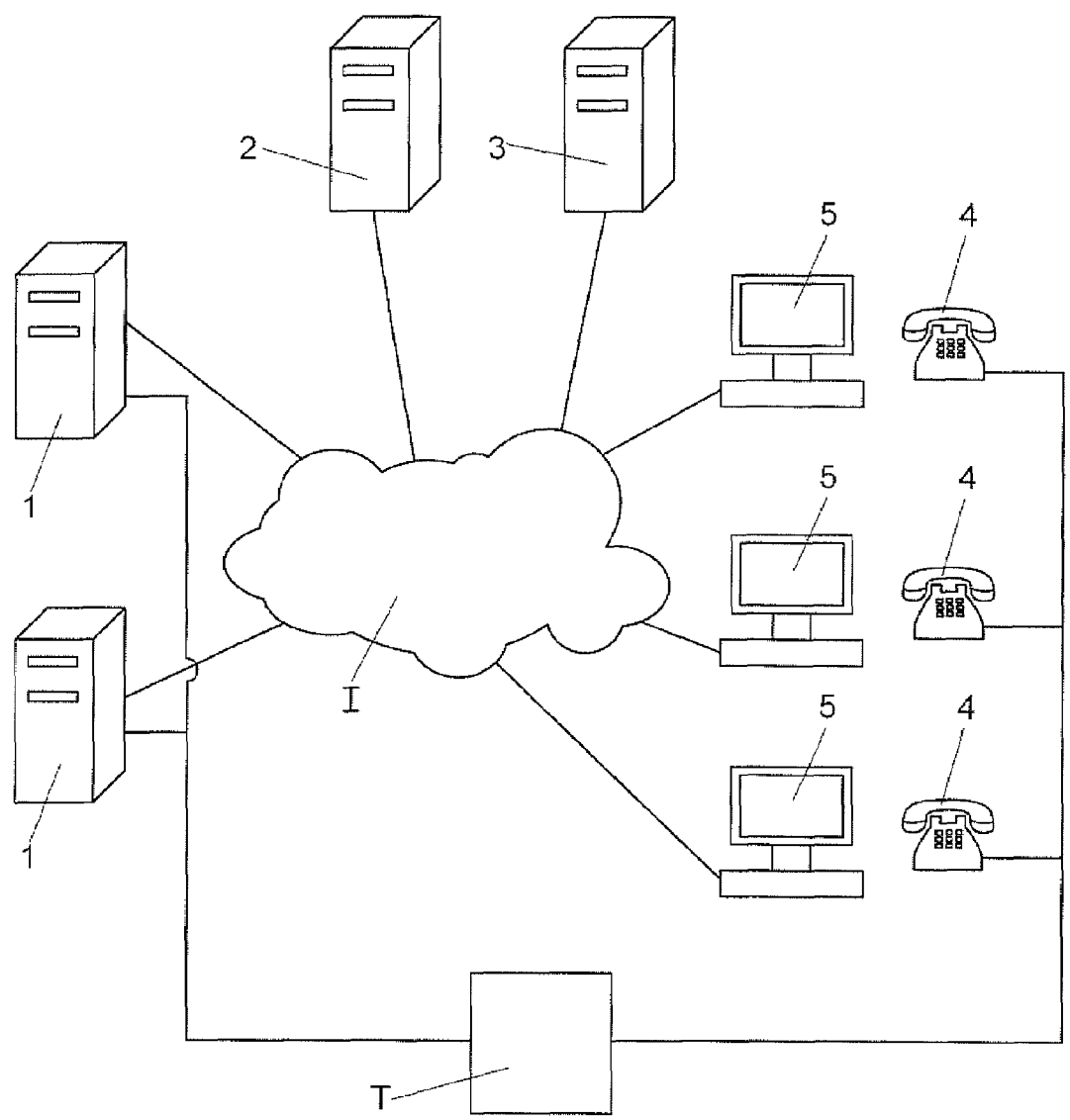
FIG. 2 shows a comprehensive implementation diagram of several nodes connected to the server computers and the monitoring server.

As shown in the referenced figures, the system is made up of nodes (1) connected to the Internet (I) and the telephone network (T). These nodes (1) are associated with a web server (2), in which the source website has several forms installed where at least the telephone number is entered, and with a monitoring server (3), where the connections with both servers (2 and 3) are also made over the Internet (I).

Each node (1) includes a node server (11) connected to the Internet (I) and associated with a database (12) of information on the goods and services that are being sold via telesales.

Each node server (11) is also connected to several PABXs (13) connected to the conventional telephone network (T), and several video servers (14) for the synchronised transmission of images over the Internet (1), configuring the sales representatives' support channels to the telephone number (4) of each user and their respective remote computer (5) connection.

The node (1) also includes the representative rooms (15) for each commercial representative. These representative rooms include a telephone terminal (16) connected to a PABX (13) and a webcam (17) or a video camera connected to a video server (14).

In practice, each representative room (15) includes a computer (18) connected to a node server (11) so that the representative can send images, presentations, photos or videos from the database (12) to the user's remote computer (5) through the Internet connection (1).

Now that the nature of the invention has been sufficiently described, along with an example of preferred implementation, it is hereby stated that for the appropriate purposes the materials, shape, size and layout of the described elements may be modified, as long as this does not involve any change to the fundamental characteristics of the invention, which are claimed below.

The invention claimed is:

1. System for call centre communications between representatives and a user having a remote device (5) comprising:
   a plurality of nodes (1), each node disposed at respective locations;
   wherein each node (1) includes;
   a primary node server (11) connected to the Internet for access from a remote computer (5) by a user:
   a PABX (13) connected to said primary node server (11) and a standard land line or cell phone channel;
   a video server (14);
   a plurality of representative rooms (15) for representatives, each room including a computer device (18), a telephone terminal (16) for a respective representative connected to said PABXs (13), said PABX (13) providing telephone communication for said telephone terminal to the user using one of a landline and a cellphone communication systems; and a webcam (17) or video camera connected said video server;
   wherein said primary node server, said PABX and said computer device associated with one of said representatives cooperate in response to a command from said representative to establish two-way voice transmission between said representative and the user, by means of the telephone communication through the telephone terminal (16) in the representative room (15) and the user's landline (4) or mobile telephone, and one-way transmission from the webcam (17) or video camera in the representative room (15) to the user's remote computer (5).

2. System, in accordance with claim 1, characterised by the video server (14) transmitting the images from the webcam (17) or video camera in compatible format that can be displayed by the user's remote computer (5) browser.

3. System, in accordance with claim 1, further comprising a database (12) characterised in that the computer device (18) is connected to said node server (11) for managing and accessing the database (12).

4. System, in accordance with claim 1, characterised by the inclusion of a monitoring server (3) connected to one or more node servers (11).

5. Procedure for call centre communications system, initiated by filling in a form on a website, by an interested user said system including a plurality of nodes, each node including a node server (11), a PABX (13) connected to said node server, a video server connected to said node server (11) and at least one representative station manned by a representative and including a representative computer connected to said node server, a representative telephone connected to said PABX and a representative video camera connected to said video server comprising the steps of:

Acquiring a user's telephone number (4) from the form by the website;

Sending the telephone number (4) and details to the node server (11) associated with said website;

Activating said PABX (13) to place a call between the user's telephone number (4);

Once the connection between the PABX (13) and the user's telephone (4) has been established, transferring the call to a representative, using the aforementioned connection between the PABX (13) and the representative telephone terminal (16) to establish a bidirectional audio connection between the user and the representative over one of landline and a cellphone;

Establishing by said node server (11) simultaneously with said audio connection a video connection through the video server (14) between the representative video camera associated with the video camera and the user's remote computer (5) in order to send images of the representative, through said webcam (17) to the user's remote computer screen, so that a conversation may take place.

6. A procedure, in accordance with claim 5, characterised by the inclusion of the transmission of visual data and images from the node server (11) database (12) to the user's remote computer (5).

* * * * *